US006834267B1

(12) United States Patent
Fuyama

(10) Patent No.: US 6,834,267 B1
(45) Date of Patent: Dec. 21, 2004

(54) VEHICLE-MOUNTED TOLL-PAYING DEVICE THAT ENABLES A SAFE VERIFICATION OF AN INSERTED IC CARD

(75) Inventor: Seiji Fuyama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/413,802

(22) Filed: Oct. 7, 1999

(30) Foreign Application Priority Data

Oct. 13, 1998 (JP) ........................................... 10-304733

(51) Int. Cl.[7] ................................................ G06F 17/60

(52) U.S. Cl. .......................................... 705/13; 340/901

(58) Field of Search ............................. 705/13; 340/901

(56) References Cited

U.S. PATENT DOCUMENTS

| | | | | |
|---|---|---|---|---|
| 4,891,503 A | * | 1/1990 | Jewell | 235/380 |
| 4,963,723 A | * | 10/1990 | Masada | 235/384 |
| 5,191,312 A | * | 3/1993 | Altmann et al. | 340/441 |
| 5,440,109 A | * | 8/1995 | Herring et al. | 235/384 |
| 5,459,304 A | * | 10/1995 | Eisenmann | 235/380 |
| 5,777,565 A | * | 7/1998 | Hayashi et al. | 340/928 |
| 5,790,051 A | * | 8/1998 | Yoshida et al. | 340/928 |
| 5,805,055 A | * | 9/1998 | Colizza | 180/287 |
| 5,926,546 A | * | 7/1999 | Maeda et al. | 705/65 |
| 5,962,833 A | * | 10/1999 | Hayashi | 235/384 |
| 6,056,357 A | * | 5/2000 | Fukuoka | 297/217.3 |
| 6,073,062 A | * | 6/2000 | Hoshino et al. | 701/3 |

FOREIGN PATENT DOCUMENTS

| | | | | |
|---|---|---|---|---|
| EP | 000577328 A2 * | 1/1994 | | G07B/15/00 |
| EP | 0759600 A2 | 2/1997 | | |
| JP | 63-255790 | 10/1988 | | |
| JP | 4-14043 | 1/1992 | | |
| WO | WO 95/08162 A1 | 3/1995 | | |

OTHER PUBLICATIONS

Birritteri, Anthony. "Will E–ZPass make us easy riders?" New Jersey Business, Sep. 1, 1996 [retrieved from Proquest].*

* cited by examiner

*Primary Examiner*—Susanna Meinecke-Diaz
*Assistant Examiner*—Catherine M. Colón
(74) *Attorney, Agent, or Firm*—Louis Woo

(57) ABSTRACT

A toll-paying device for use in a vehicle passing through a lane having a tollhouse in a toll collection system. In response to a driver inserting an IC card which at least stores a card ID in the card slot of the device, a traveling status of the vehicle is detected to indicate an immobile or running state. In case of a running state of the vehicle, the driver is prohibited from entering a code such as a card ID or password. If the vehicle is stopped, the code entry is permitted. In an embodiment, the codes of IC cards that have been validated are registered in the toll-paying device so that if the driver uses one of the registered IC card, he or she is permitted to omit the code entry for the IC card. Techniques for preventing the driver from leaving his or her IC card in the keyhole of the vehicle is also disclosed.

32 Claims, 7 Drawing Sheets

VEHICLE-MOUNTED TOLL-PAYING DEVICE THAT ENABLES A SAFE VERIFICATION OF AN INSERTED IC CARD

BACKGROUND OF THE INVENTION

1. Field of the Invention

The invention generally relates to an electronic toll collection (ETC) system for use in a toll road or expressway and, more particularly, to a toll paying method and device for use with a vehicle passing through a lane having a tollhouse.

2. Description of the Prior Art

In an ETC system, a device installed in a tollhouse automatically collects a toll from an account of the owner of a vehicle passing through the tollhouse by the device communicating information necessary for the charging with a vehicle-mounted device. Such a system permits vehicles to pay their tolls without stopping at the tollhouse, contributing to the relief of traffic congestion near the tollhouse.

The verification of the owner identification is achieved by the vehicle-mounted device reading an IC card of the owner. In order to prevent an IC card from being used by a person who illegally obtained the IC card, vehicle-mounted devices are sometimes configured to making the user enter a password or an identification number associated with the IC card when he or she inserts the IC card for validating the inserted IC card on the condition that the entered password or identification (ID) code matches the card ID code stored in the inserted IC card.

However, if the user tried to enter a password or ID code while the vehicle is running, it would be very dangerous and might cause a traffic accident.

It is therefore an object of the invention to provide a vehicle-mounted toll-paying device that prohibits the driver from entering a code, e.g., a password or ID code during vehicle running for the sake of the safety.

SUMMARY OF THE INVENTION

According to the invention, a toll-paying device for use in a vehicle passing through a lane having a tollhouse in a toll collection system is provided. The toll-paying device comprises means for permitting a driver an insert of an IC (integrated circuit) card which at least stores a card ID to use the IC card; means for permitting the driver to enter a code associated with the IC card; means, responsive to the code, for keeping an indication of the validity of the IC card during a period of use of the IC card only if the IC card is valid; means responsive, only during the indication, to a detection of the tollhouse for executing a toll paying process; means for detecting a traveling status of the vehicle to indicate an immobile or running state; and means operative during the running state for prohibiting the driver from entering the code and disabling the means for permitting the driver to enter a code. If the vehicle is stopped, the code entry is permitted.

In one embodiment, the codes of IC cards that have been validated are registered in the toll-paying device so that if the driver uses one of the registered IC card, he or she is permitted to omit the code entry for the IC card.

Techniques for preventing the driver from leaving his or her IC card in the keyhole of the vehicle is also disclosed.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Figure 1:
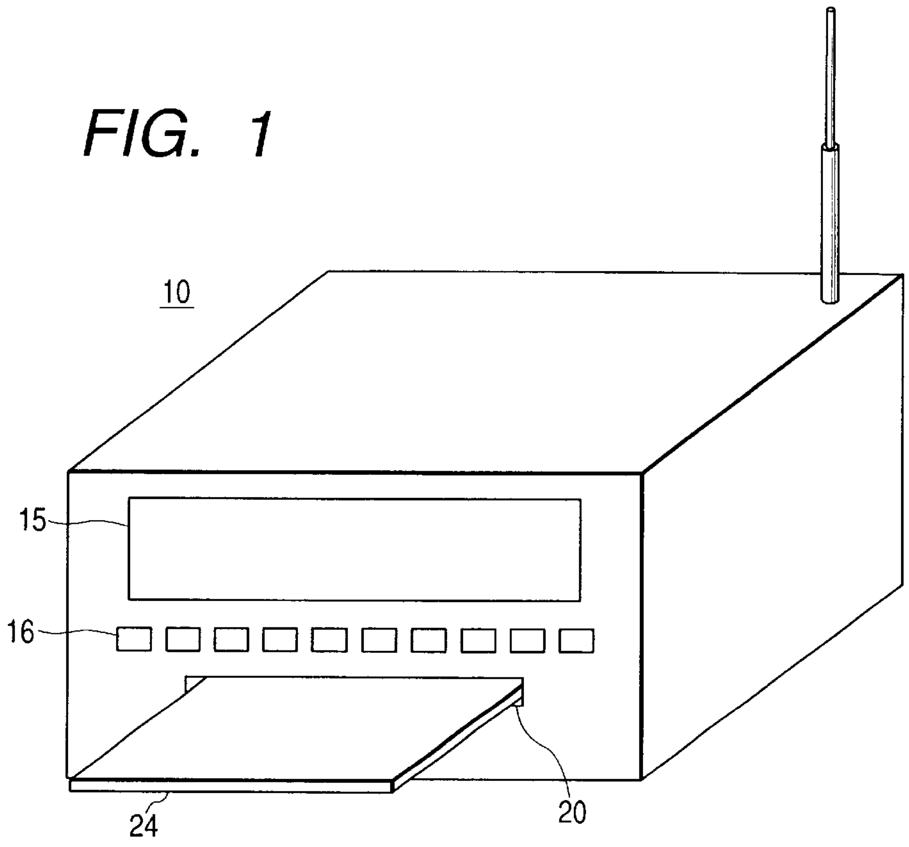
FIG. 1 is an illustration giving an exterior view of a main body of a vehicle-mounted toll paying system that prohibits the driver from entering a code, e.g., a password or ID code during vehicle running for the sake of the safety in accordance with the principles of the invention.
Figure 2:
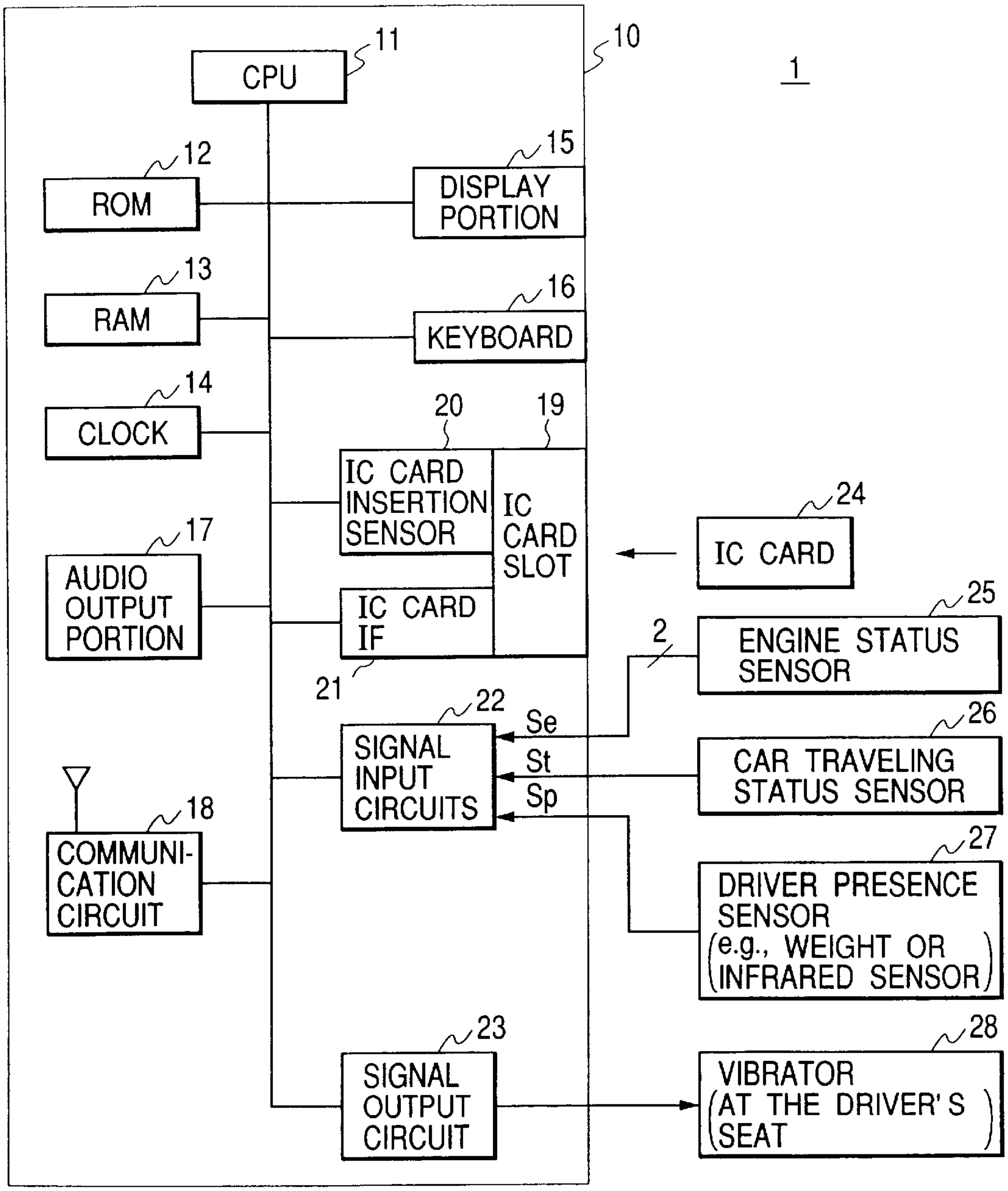
FIG. 2 is a schematic block diagram showing an overall arrangement of the vehicle-mounted toll paying system.

FIG. 1 is an illustration giving an exterior view of a main body 10 of a vehicle-mounted toll paying system that prohibits the driver from entering a code, e.g., a password or ID code during vehicle running for the sake of the safety in accordance with the principles of the invention. FIG. 2 is a schematic block diagram showing an overall arrangement of the vehicle-mounted toll paying system 1. In FIGS. 1 and 2, the toll paying system 1 comprises the main body 10. The main body 10, which is basically a microcomputer, comprises CPU (central processing unit) 11; ROM (read only memory) 12 for storing a program including various subroutines as detailed later; RAM (random access memory) 13; a clock 14 for providing a clock signal; a display portion 15 on which various information is displayed; a keyboard portion 16 for permitting a user to input data such as a password, an ID code, etc.; an audio output portion 17 for providing an audio output; a communications circuit 18 for communicating with the device of a tollhouse (not shown); an IC card slot 19 in which an IC card 24 is set; an IC card insertion sensor 20 for detecting the insertion of an IC card 24; an IC card interface (IF) 21 for transferring data to and from the inserted IC card 24; signal input circuits 22 for receiving signals Se (2 bits), St and Sp from an engine status sensor 25, a car traveling status sensor 26 and a driver presence sensor 27 for detecting the presence of a person at the driver's seat (not shown), respectively; and a signal output portion 23 for supplying a signal to a vibrator at the driver's seat.

Figure 3:
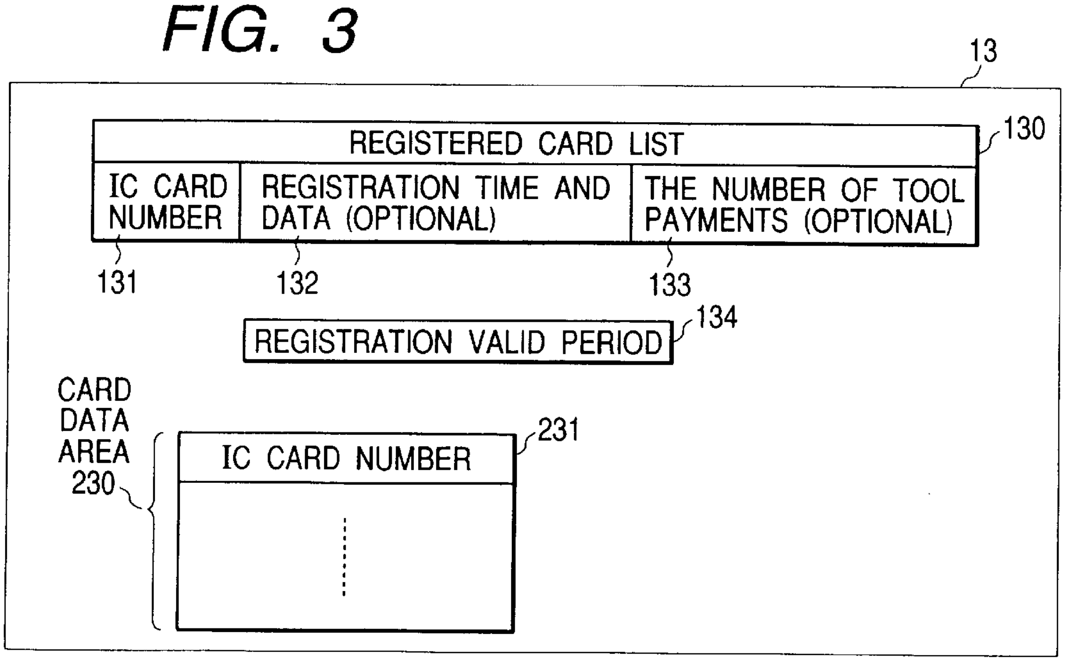
FIG. 3 is a diagram showing a registered IC card table of the vehicle-mounted toll paying system 1.

The RAM 13 is preferably a non-volatile memory so as to retain data even when an electric subsystem is off. The non-volatile RAM 13 may be realized for example as a flash RAM or a C-MOS (complementary metal oxide semiconductor) RAM backed up with a battery. FIG. 3 is a diagram showing exemplary contents of RAM 13. According to the principles of the invention, the toll paying system 1 may be provided with a registered card list or table 138 for storing the IC card numbers for the IC cards that can be used (are treated as valid) without entering respective passwords. The registered card list or table 138 at least has an IC card number field.

The signal Se from the engine status sensor 25 is a two-bit signal. Specifically, the binary values 00, 01 and 11 of the signal Se correspond to the following states of the engine system (not shown) as shown in a table below.

| Se | the engine system status |
|---|---|
| 00 | the electric subsystem is off (car key has not turned at all) |
| 01 | the electric subsystem is on (car key has turned to a first position) |
| 11 | the engine is running |

The traveling status signal St takes a binary value 0 or 1, e.g., for the immobility or the running state of the vehicle, respectively. The signal Sp from the driver presence sensor 27 takes a binary value 0 or 1, e.g., for the absence or the presence at a driver's seat, respectively. The driver presence sensor 27 may be any suitable sensor such as a weight sensor set under the driver's seat or an infrared sensor.

Figure 4:
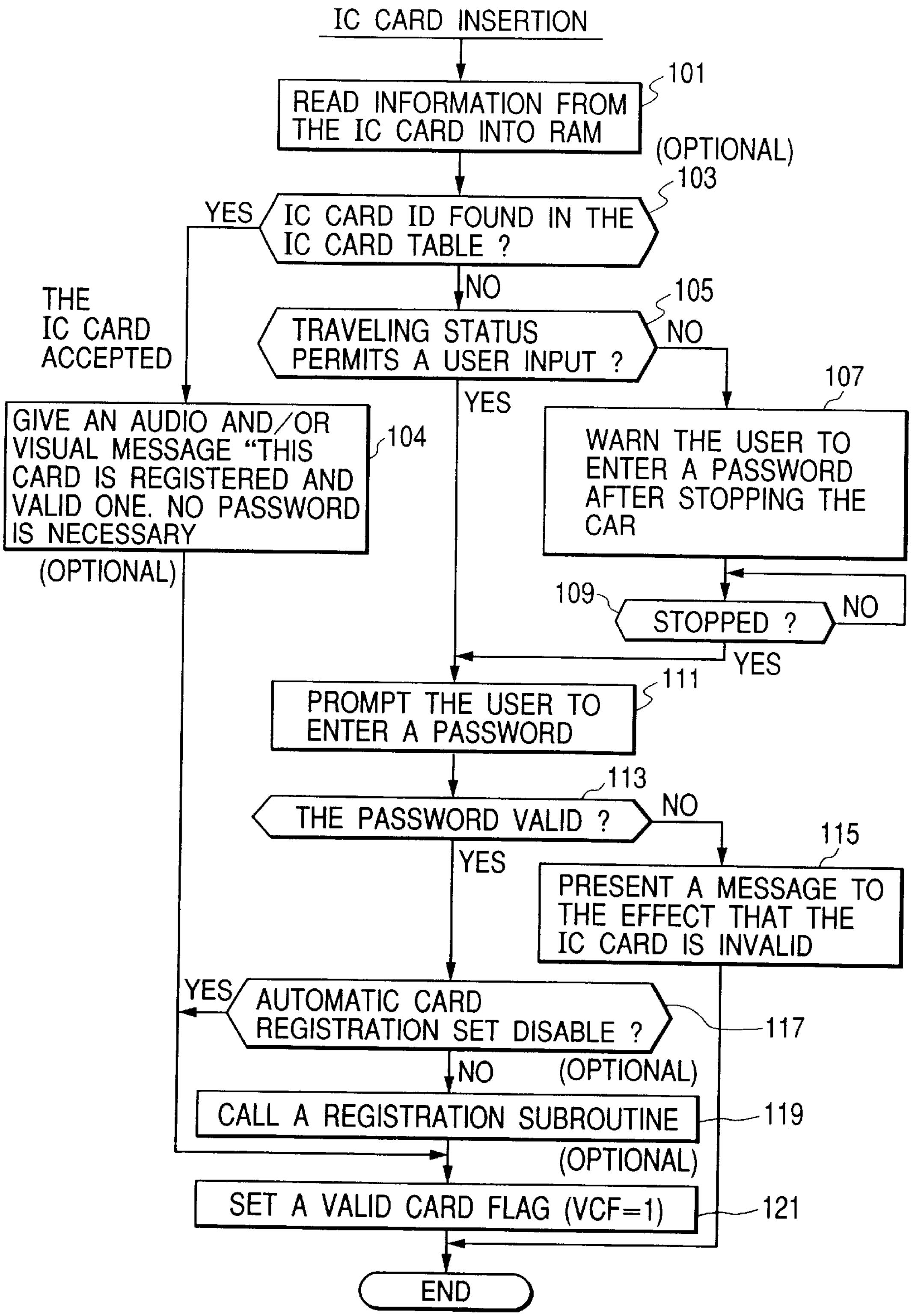
FIGS. 4 through 9 are flowcharts of the operation of the vehicle-mounted toll paying system 1 of FIGS. 1 and 2.

FIG. 4 is a flowchart of the operation of an interrupt subroutine invoked in response to the IC card insertion detector 20 detecting an insertion of an IC card 24. In FIG. 4, CPU 11 first causes information to be read out of the IC card 24 via IC card interface 21 into a card data area 239 of RAM 13 as shown in FIG. 4 in step 101. The information stored in the area 239 includes an IC card number 231, an account number used for toll payment, the balance, etc.

In decision step 103, CPU 11 makes a test to see if the read IC card number 231 is found in the IC card table 138. If so, it means that the card has been verified once through the comparison between the card number 231 stored in the IC card 24 and the number entered by the user. In this case, the inserted IC card 24 is judged to be valid and accordingly the control is passed to step 121, where a valid card flag VCF (not shown) in RAM 13 is set to 1. Then, CPU 11 returns to a main program. It is noted that step 104 may be added after a test result of YES in step 103. In step 104, CPU 11 provides an audio and/or visual message "This IC card is already registered and valid. No password is necessary".

If the read IC card number 231 is not found in the IC card table 138 in step 103, then CPU 11 proceeds to step 105 to make a test to see if the traveling status permits a user to input a password through the keyboard portion 16, i.e., if the traveling status sensor signal St is logical "0" meaning the immobility of the vehicle. If not, i.e., St=1, then CPU 11 proceeds to step 107. In step 107, CPU 11 warns the user to enter a password after stopping the vehicle by displaying a message "Password entry is only permitted during the car stoppage." and/or by providing an voice message to the same effect through the audio output portion 17. Then, CPU 11 proceeds to step 109, where CPU 11 waits till the vehicle is stopped.

If the vehicle is stopped in step 109 or if the traveling status is in the immobility of the vehicle, i.e., St 0 in step 105, then CPU 11 proceeds to step 111 to prompt the user to enter a password, e.g., by displaying a message "Please enter a password from the keyboard." and by providing an voice message to the same effect through the audio output portion 17. In step 113, CPU 11 makes a test to see if the entered password is valid by comparing the entered password (an IC card ID number in this specific example) with the read IC card number 231. If not, then CPU 11 presents a message to the effect that the inserted IC card 24 is invalid in step 115 and returns to the main program.

In a preferred embodiment, if the entered password is valid, then CPU 11 proceeds to step 117 to make a test to see if an automatic card registration function is set disable. If so, then CPU 11 simply proceeds to step 121 to set a valid card flag VCF to 1, and then returns to the main program. VCF being 1 means that the inserted IC card 24 is valid. As long as VCF is 1, the vehicle-mounted toll paying system 1 automatically performs a toll paying process in a conventional manner when the vehicle passes through a tollhouse.

Figure 5:
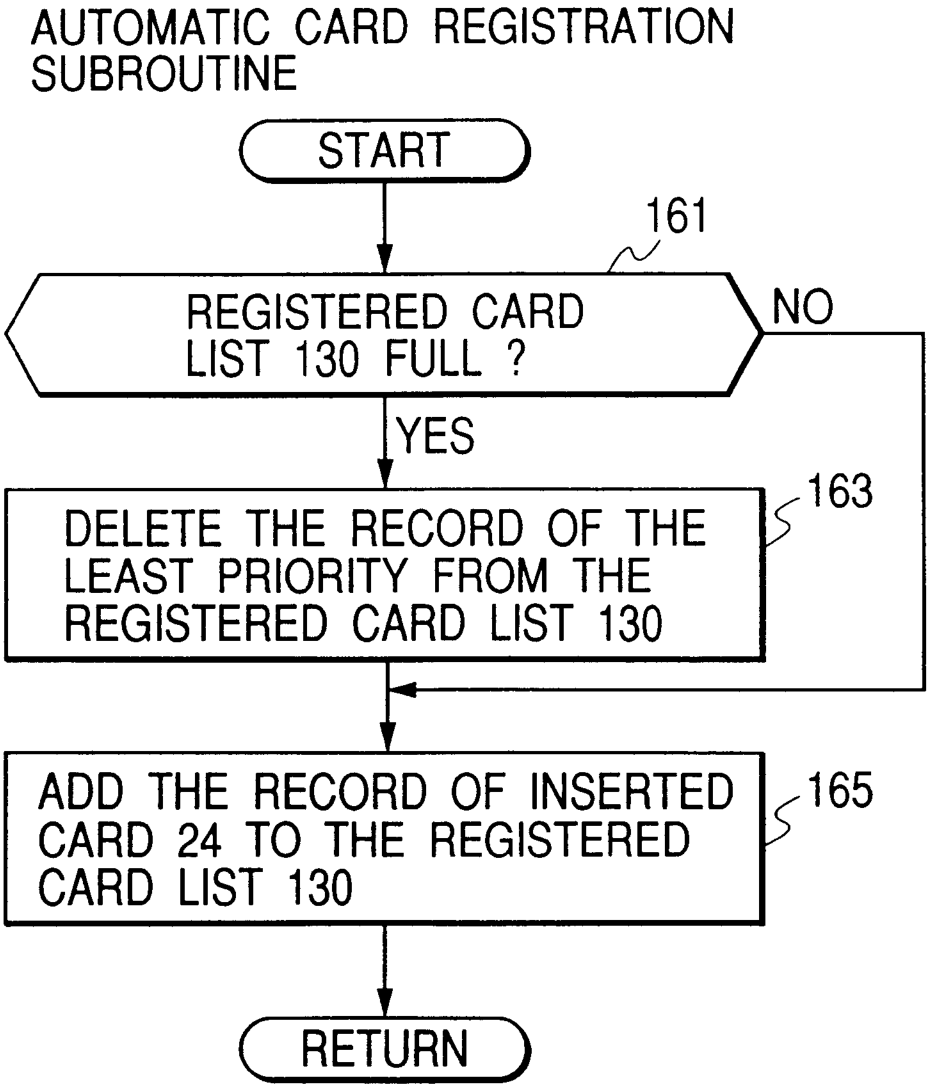

If the automatic card registration function is not set disable or set enable in step 117, then CPU 11 calls a card registration subroutine in step 119 before proceeding to step 121. FIG. 5 is a flowchart of the operation of the automatic card registration subroutine. In FIG. 5, CPU 11 makes a test to see if the registered card table 130 has a possible maximum number of cards registered in step 161.

If so, then CPU 11 deletes the record of the lowest priority from the table 130 in step 163. In this case, the priority can be judged based on various criterions. A simplest deleting scheme is to delete the first registered record in a first-in first-out manner as practiced in a well-known data buffer. After step 163 or the decision of NO in step 161, CPU 11 proceeds to step 165 to add the record of the inserted IC card 24 (the ID number of card 24 in this case) to the registered card table 130, and returns to the main program.

If the registered card table 130 contains a registration time and date field 132 as shown in FIG. 3, then step 163 may be configured to delete record(s) which has (or have) been registered for a period exceeding a predetermined registration valid period 134 stored in RAM 13. The (registered) period is calculated by subtracting the current time and date from the registration time and date 132. It is noted that the registration valid period 134 may be set either through the keyboard portion 16 or through the communications circuit 18 from the tollhouse device (not shown).

If the registered card table 130 contains a field 133 for the number of toll payments as shown in FIG. 3, then the toll payment system 1 may be configured to increment the value of the field 133 for the IC card number of the IC card 24 inserted in the card slot 20 in a toll paying process each time the vehicle passes through a tollhouse; and step 163 may be configured to delete a record with the minimum value in the field 133.

It should be noted that the vehicle-mounted toll paying system 1 may be configured not to have the registered card table 130. In this case, steps 103, 117 and 119 are omitted. However, providing the system 1 with the registered card table 130 and step 103 enables the password entry to be omitted if the inserted IC card 24 is already registered in the table 130.

Figure 6A:
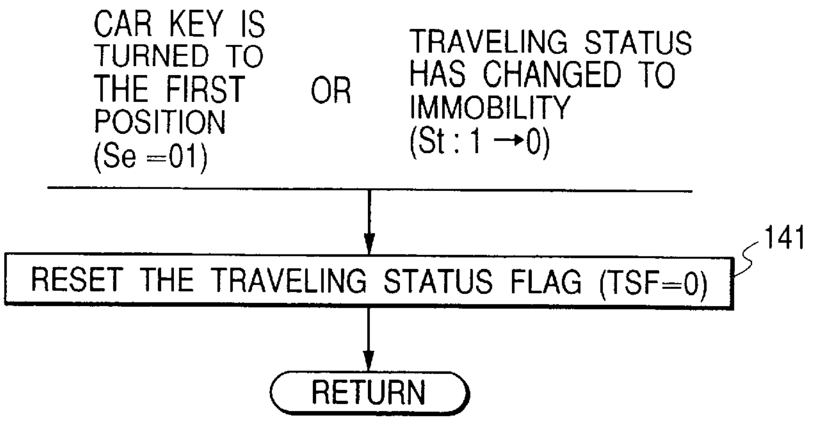
Figure 6B:
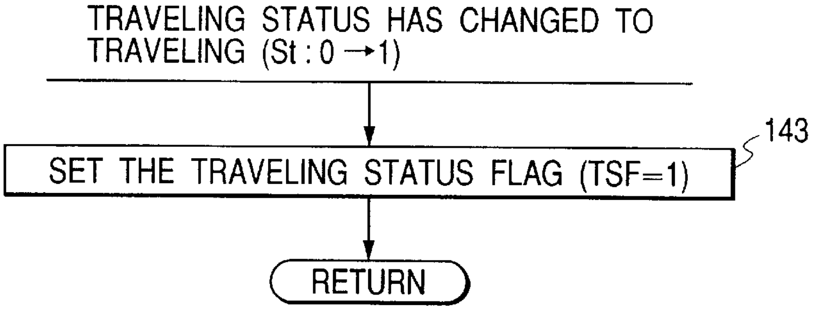

FIGS. 6A and 6B are flowcharts of the operation executed by CPU 11 under the control of interrupt subroutines for managing a traveling status flag TSF indicative of whether the vehicle is running or not. An interrupt subroutine of FIG. 6A is invoked if the engine status sensor signal Se from the sensor 25 is set to logical "01" (i.e., the electric subsystem (not shown) is turned on or the car key is turned to the first position), or if the travel status signal St from the sensor 26 is changed from 1 to 0 (i.e., from running to immobility). In this case, CPU 11 resets the traveling status flag TSF, i.e., sets TSF to 0 in step 141, and returns to the main routine.

Alternatively, as shown in FIG. 6B, if the travel status signal St is changed from 0 to 1 (i.e., from immobility to running), then CPU 11 sets the traveling status flag TSF, i.e., sets TSF to 1 in step 143, and returns to the main routine.

Figure 7:
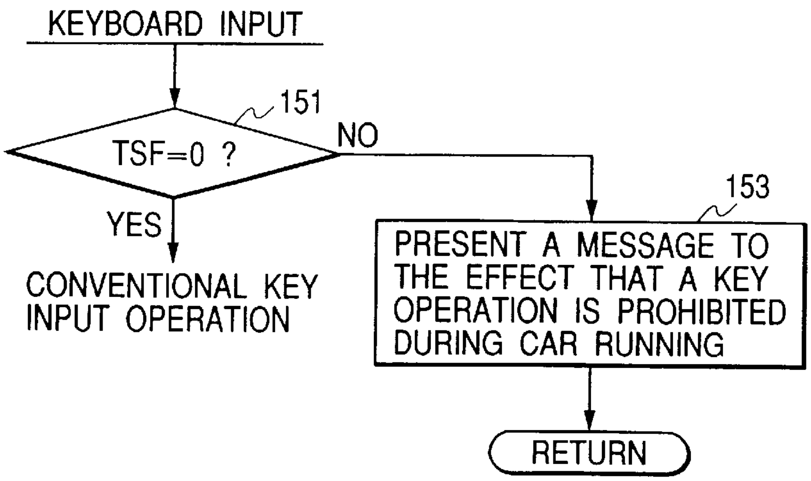

FIG. 7 is a flowchart of the operation of an interrupt subroutine invoked in response to a key input from the keyboard portion 16. If a key input is detected, CPU 11 makes a test to see if the traveling status flag TSF is zero in step 151. If so, then CPU 11, thereafter, performs a conventional key input operation. If not, then CPU 11 displays a message to the effect that a key operation is prohibited during running of vehicle and also provides a voice message to the same effect in step 153. Then, CPU 11 returns to the main program. In this way, the user is prohibited from operating the keyboard portion 16, this ensures the safety of vehicle driving.

Figure 8:
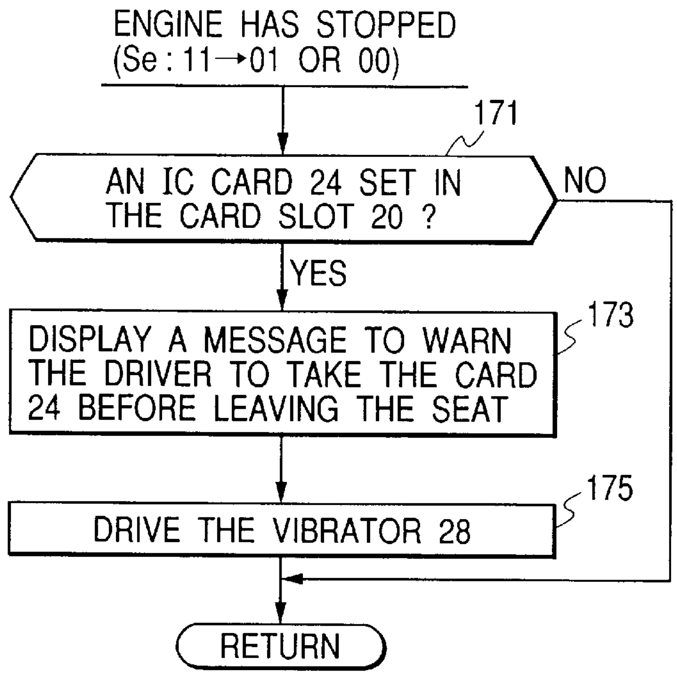
Figure 9:
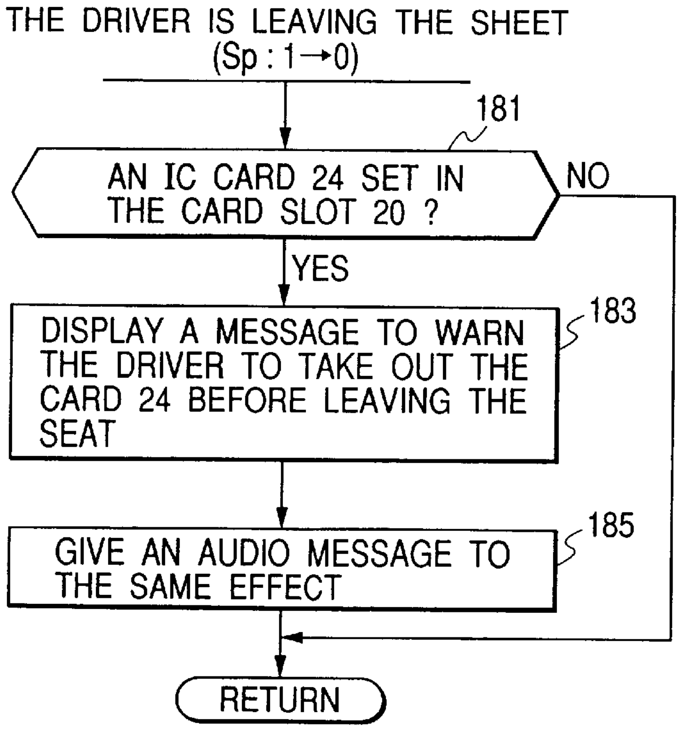

FIGS. 8 and 9 are flowcharts of the operation executed for preventing the driver from leaving his or her IC card in the IC card slot. If the engine status signal Se has changed from logical "11" to logical "01" or "00" or the engine has stopped, then an interrupt subroutine of FIG. 8 is invoked. In this case, CPU 11 makes a test in step 171 to see if an IC card is inserted in the card slot 20. If not, then CPU 11 simply returns to the main program. If any IC card is in the card slot 20, then CPU 11 displays a message to warn the driver to take the card 24 before leaving the vehicle or the driver's seat (not shown) in step 173, and proceeds to step 175. CPU 11 drives the vibrator 28 provided at the driver's seat through the signal output circuit 23 to inform the driver of the message displayed on the display portion 15. It is noted that CPU 11 may also provide a voice message saying "Please take the IC card with you before you leave the seat" in step 173. Then, CPU 11 returns to the main program.

If the driver presence sensor signal Sp from the sensor 28 has changed from 1 to 0, meaning that the driver is leaving his or her seat (or vehicle), then an interrupt subroutine of FIG. 9 is invoked. In this case, CPU 11 makes a test in step 181 to see if an IC card is inserted in the card slot 20. If not, then CPU 11 simply returns to the main program. If any IC card 24 is in the card slot 20, then CPU 11 displays a message to warn the driver to take the card 24 before leaving the driver's seat (not shown) in step 183, and proceeds to step 185. CPU 11 also provides a voice message saying "Please take the IC card with you before you leave the seat" in step 185. Then, CPU 11 returns to the main program.

In the above description, any visual or audio message may be replaced with an appropriate sound. Also, any appropriate sound may be added to any of the above audio and visual messages.

In the above-described embodiment, for the verification of the inserted IC card 24, the card ID number of the inserted IC card 24 is used. However, in order to verify the validity of the inserted IC card 24, a specific password associated with the inserted IC card 24 may be used instead of the card ID number.

Figure 10:
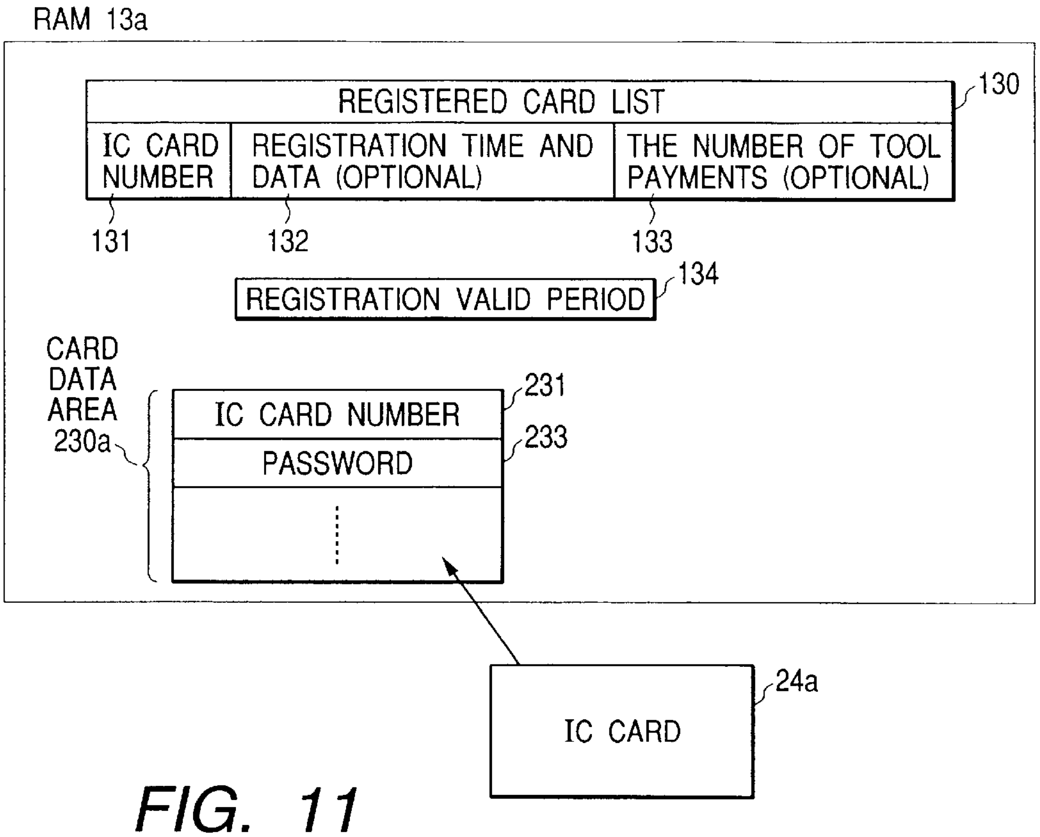
FIG. 10 is a diagram showing the contents of RAM 13*a* used in a toll paying system that uses a password stored in an IC card 24*a* for the verification of the inserted IC card 24*a*.

FIG. 10 is a diagram showing the contents of RAM 13*a* used in a toll paying system that uses a password stored in an IC card 24*a* for the verification of the inserted IC card 24*a*. In this case, the password 233 stored in the IC card 24*a* is read out into the card data area 230*a* of RAM 13*a* in the above-described step 101. The password entered by the user is compared with the password 233 in RAM 13*a*.

Figure 11:
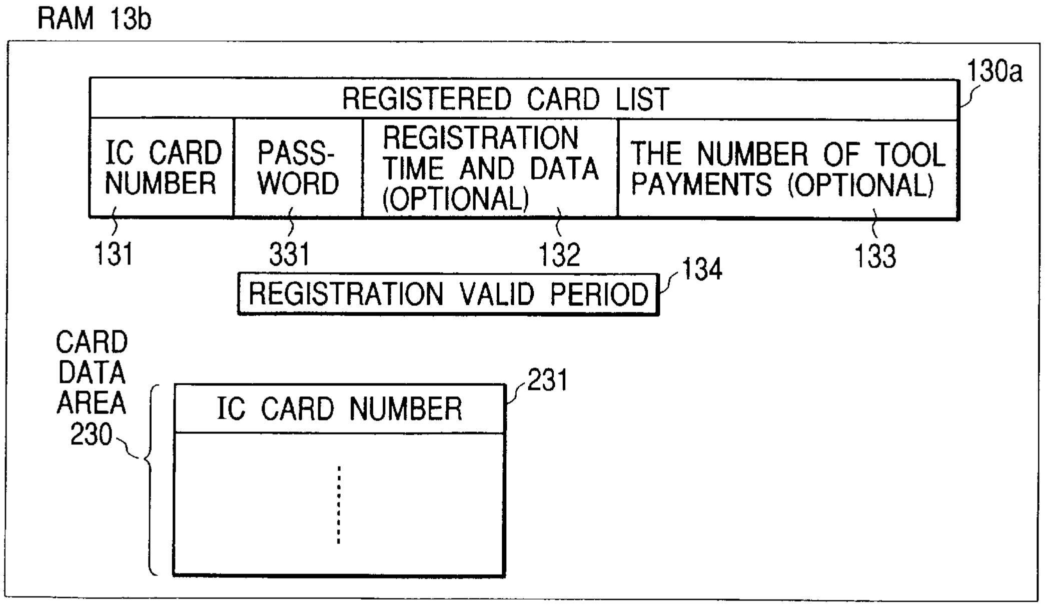
FIG. 11 is a diagram showing the contents of RAM 13*b* used in a toll paying system that uses passwords stored in RAM 13*b* for the verification of the inserted IC card 24.

FIG. 11 is a diagram showing the contents of RAM 13*b* used in a toll paying system that uses passwords stored in RAM 13*b* for the verification of the inserted IC card 24. In this case, a password 331 associated with the IC card number 131 is entered either in the above-described step 165 of the automatic card registration subroutine or for each record in the table 130*a* when the entire table 130*a* is created. The password entered by the user is compared with the password 331 in the table 130*b* of RAM 13*b*

Though the registered IC card table 130 has been automatically created by the automatic card registration subroutine, the table 130 may be created by entering necessary data either through the keyboard portion 16 or through the communications circuits 18.

The foregoing merely illustrates the principles of the invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A toll-paying device for use in a vehicle passing through a lane having a tollhouse in a toll collection system, the device comprising:

means for permitting a driver an insertion of an IC (integrated circuit) card, which at least stores a card ID to use said IC card;

means for permitting said driver to enter a code associated with said IC card;

means, responsive to said code, for keeping an indication of the validity of said IC card during a period of use of said IC card only if said IC card is valid;

means responsive, only during said indication, to a detection of said tollhouse for executing a toll paying process;

means for detecting by using a car traveling status sensor a traveling status of said vehicle to indicate an immobile or running state; and means operative during said running state for prohibiting said driver from entering said code and disabling said means for permitting said driver to enter a code.

2. A toll-paying device as defined in claim 1, wherein said means for prohibiting a user comprises means, responsive to said insertion of said IC card during said running state, for providing a message to the effect that code entering is prohibited while said vehicle is running.

3. A toll-paying device as defined in claim 2, wherein said means for providing a message comprises an arbitrary combination of means for providing a visual message, means for providing a voice message and means for providing a sound message, said arbitrary combination including a single item.

4. A toll-paying device as defined in claim 1, further comprising means, responsive to said insertion of said IC card during said immobile state, for prompting said driver to enter said code.

5. A toll-paying device as defined in claim 2, wherein said means for prompting said driver to enter said code comprises an arbitrary combination of means for providing a visual message, means for providing a voice message and means for providing a sound message, said arbitrary combination including a single item.

6. A toll-paying device as defined in claim 1, further comprising means, responsive to an input of data by said driver during said running state, for prohibiting a data entry during said running state.

7. A toll-paying device as defined in claim 6, wherein said means for prohibiting a data entry during said running state includes:

means for disabling said means for permitting said driver to enter a code; and means for providing a message to the effect that said data entry is prohibited during said running state.

8. A toll-paying device as defined in claim 7, wherein said means for providing a message comprises an arbitrary combination of means for providing a visual message, means for providing a voice message and means for providing a sound message, said arbitrary combination including a single item.

9. A toll-paying device as defined in claim 1, further comprising means, responsive to a detection of an stoppage of an engine of said vehicle during said insertion of said IC card, for warning said driver to take said IC card before leaving said vehicle.

10. A toll-paying device as defined in claim 9, wherein said means for warning said driver includes:

means for displaying a message warning said driver to take said IC card before leaving said vehicle; and means for giving said driver a vibration.

11. A toll-paying device as defined in claim 10, wherein said means for giving said driver a vibration comprises means for vibrating a driver's seat.

12. A toll-paying device as defined in claim 9, further comprising means, operative in the event said driver is leaving his or her seat, for warning said driver to take said IC card before leaving said vehicle.

13. A toll-paying device as defined in claim 12, wherein said means for warning said driver includes means for detecting a presence of said driver at said seat.

14. A toll-paying device as defined in claim 13, wherein means for detecting a presence comprises means, located at said seat, for sensing a weight.

15. A toll-paying device as defined in claim 13, wherein means for detecting a presence comprises means for sensing a infrared light.

16. A toll-paying device as defined in claim 12, wherein said means for warning said driver includes means for providing a voice message warning said driver to take said IC card before leaving said vehicle.

17. A toll-paying device as defined in claim 1, further comprising: means for retaining records of IC cards the validity of which have been verified, each of said record at least including an IC card ID;

means, responsive to the entering of said code, for searching said record retaining means for said code; and means, responsive to the finding of said code in said record retaining means, for causing said driver to omit entering said code.

18. A toll-paying device as defined in claim 17, wherein said means for causing said driver to omit entering said code includes means for providing a voice message to the effect that the entry of said code is not necessary.

19. A toll-paying device as defined in claim 17, further comprising means, responsive to said validity verified by said means for keeping an indication of the validity, for adding an record for said IC card to said record retaining means.

20. A toll-paying device as defined in claim 19, wherein said record retaining means has a limit in the number of said record and wherein said means for adding an record for said IC card includes means, responsive to a determination that said limit has been reached, for deleting, from said record retaining means, at least one of said records according to priorities associated with respective records.

21. A toll-paying device as defined in claim 20, wherein said means for deleting one of said records includes means for deleting a record that was first registered to said record retaining means.

22. A toll-paying device as defined in claim 20, wherein each of said records includes a registration time and date and wherein said means for deleting one of said records comprises means for deleting at least one record that has a registration period exceeding a predetermined period, said registration period of each record being given by subtracting a current time and date from said registration time and date of the record.

23. A toll-paying device as defined in claim 20, wherein each of said records includes the number of toll payments and wherein said means for deleting one of said records comprises means for deleting a record that has a least number of toll payments.

24. A toll-paying device as defined in claim 19, wherein said record retaining means has a limit in the number of said record and wherein the toll paying device further comprises means, responsive to a determination that said limit has been reached, for disabling said means for adding an record for said IC card to said record retaining means.

25. A method of verifying the validity of an IC card inserted in a vehicle-mounted toll-paying device for use in a toll collection system, wherein said toll paying system comprises means for permitting a driver an insertion of an IC (integrated circuit) card which at least stores a card ID to use said IC card; means for permitting said driver to enter a code associated with said IC card; means, responsive to said code, for keeping an indication of the validity of said IC card during a period of use of said IC card only if said IC card is valid; means responsive, only during said indication, to a detection of a tollhouse for executing a toll paying process, the method including:

detecting by using a car traveling status sensor a traveling status of said vehicle to indicate an immobile or running state; and in case of said running state, prohibiting said driver from entering said code and disabling said means for permitting said driver to enter a code.

26. A method as defined in claim 25, wherein said step of prohibiting a user comprises the step of, in response to said insertion of said IC card during said running state, providing a message to the effect that code entering is prohibited while said vehicle is running.

27. A method as defined in claim 25, further comprising the step of, in response to said insertion of said IC card during said immobile state, prompting said driver to enter said code.

28. A method as defined in claim 25, further comprising the step of, in response to an input of data by said driver during said running state, prohibiting a data entry during said running state.

29. A method as defined in claim 25, further comprising the step of, in response to a detection of an stoppage of an engine of said vehicle during said insertion of said IC card, warning said driver to take said IC card before leaving said vehicle.

30. A method as defined in claim 25, further comprising the steps of: retaining records of IC cards the validity of which have been verified, each of said record at least including an IC card ID;

in response to the entering of said code, searching said record retaining means for said code; and in response to the finding of said code in said record retaining means, causing said driver to omit entering said code.

31. A method as defined in claim 29, further comprising the step of, in response to said validity verified by said step of keeping an indication of the validity, adding an record for said IC card to said record retaining means.

32. A method as defined in claim 31, wherein said record retaining step has a limit in the number of said record and wherein the method further comprises the step of, in response to a determination that said limit has been reached, disabling said step of adding an record for said IC card to said record retaining means.

* * * * *

UNITED STATES PATENT AND TRADEMARK OFFICE

CERTIFICATE OF CORRECTION

PATENT NO. : 6,834,267 B1 
DATED : December 21, 2004
INVENTOR(S) : Seiji Fuyama

It is certified that error appears in the above-identified patent and that said Letters Patent is hereby corrected as shown below:

Column 6,
Line 13, after "A" insert -- vehicle-mounted --.
Line 49, change "2" to -- 4 --.

Column 8,
Line 12, after "card" insert -- , comprising the steps of: --;
Delete lines 13-22;
Line 26, delete "and";
Between lines 26 and 27, insert the following:

-- permitting a driver to insert an IC (integrated circuit) card which at least stores a card ID in a vehicle-mounted toll-paying device for use in a toll collection system;

inserting said IC card in said vehicle-mounted toll-paying device;

permitting said driver to enter a code associated with said IC card;

keeping an indication of the validity of said IC card during a period of use of said IC card only if said IC card is valid in response to said code;

executing a toll paying process in response to a detection of a tollhouse only during said indication; --

Line 27, before "in" insert -- wherein, --, delete the first occurrence of "said" and insert therefor -- the detection of a --;
Line 28, delete the second occurrence of "said".

Signed and Sealed this

Second Day of August, 2005

JON W. DUDAS
*Director of the United States Patent and Trademark Office*